United States Patent
Tsuiki et al.

(10) Patent No.: US 8,661,651 B2
(45) Date of Patent: Mar. 4, 2014

(54) METHOD FOR MANUFACTURING A STATOR FOR A ROTARY ELECTRIC MACHINE

(75) Inventors: Hironori Tsuiki, Chiyoda-ku (JP);
Yukinobu Karata, Chiyoda-ku (JP);
Shinichiro Yoshida, Chiyoda-ku (JP);
Hiroyuki Akita, Chiyoda-ku (JP);
Masaya Inoue, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 35 days.

(21) Appl. No.: 13/398,272

(22) Filed: Feb. 16, 2012

(65) Prior Publication Data
US 2012/0286619 A1    Nov. 15, 2012

(30) Foreign Application Priority Data
May 13, 2011   (JP) ................................. 2011-108171

(51) Int. Cl.
*H02K 15/00*    (2006.01)

(52) U.S. Cl.
USPC ................................. 29/596; 29/606; 29/609

(58) Field of Classification Search
USPC ................... 29/596, 592, 606, 609, 732, 744;
310/71, 215, 216.001, 216.008, 310/216.009
See application file for complete search history.

(56) References Cited

U.S. PATENT DOCUMENTS
7,471,025 B2 *  12/2008  Sheeran et al. ........ 310/216.009

FOREIGN PATENT DOCUMENTS
JP          2004-328894 A      11/2004

* cited by examiner

*Primary Examiner* — Thiem Phan
(74) *Attorney, Agent, or Firm* — Sughrue Mion, PLLC

(57) ABSTRACT

The rotary electric machine includes a rotor, and a stator including an stator core that is formed by laminating and integrating magnetic steel plates, and concentrated winding coils that are mounted to respective teeth, the stator being disposed so as to surround the rotor. Bobbins each including a trunk portion and first and second guide portions that are disposed so as to protrude from two longitudinal ends of an upper surface of the trunk portion are disposed so as to place bottom surfaces of the trunk portions alongside two axial end surfaces of the teeth. The concentrated winding coils are configured by winding a conductor wire a predetermined number of times around the teeth so as to pass through a concave space that is formed by the trunk portions and the first and second guide portions at two axial ends of the teeth.

2 Claims, 9 Drawing Sheets

METHOD FOR MANUFACTURING A STATOR FOR A ROTARY ELECTRIC MACHINE

BACKGROUND OF THE INVENTION

1. Field of the Invention

The present invention relates to a rotary electric machine that is used in an automotive electric motor, etc., that is mounted to an automobile, for example, and to a method for manufacturing a stator that is used therein.

2. Description of the Related Art

In conventional stators, coils are mounted onto respective magnetic poles by disposing winding jigs alongside two axial end surfaces of the magnetic poles, winding a wire material around the magnetic poles and the winding jigs, and then pulling the winding jigs out from between the magnetic poles and the wire material (see Patent Literature 1, for example).
Patent Literature 1: Japanese Patent Laid-Open No. 2004-328894 (Gazette)

In conventional stators, because the coils are formed by winding the wire material around the magnetic poles and the winding jigs and then pulling the winding jigs out from between the magnetic poles and the wire material, large gaps are formed between the coils and the magnetic poles. Thus, if a rotary electric machine that uses a conventional stator is mounted to an automobile, one problem has been that the coil may move due to vibration, and be dislodged from the magnetic poles, or rub against the magnetic poles, giving rise to insulation failure.

SUMMARY OF THE INVENTION

The present invention aims to solve the above problems and an object of the present invention is to provide a rotary electric machine in which a pair of bobbins are mounted to two axial ends of a tooth, a conductor wire is wound around the pair of bobbins and forms a concentrated winding coil, and movement of the concentrated winding coil is restricted by the pair of bobbins, to enable the occurrence of insulation failure due to disengagement from the tooth and abrasion with the tooth to be suppressed, and to provide a method for manufacturing a stator that is used therein.

In order to achieve the above object, according to one aspect of the present invention, there is provided a rotary electric machine including: a rotor; and a stator including: an annular stator core that is formed by laminating and integrating magnetic steel plates; and concentrated winding coils that are mounted to respective teeth of the stator core, the stator being disposed so as to surround the rotor, the rotary electric machine being characterized in that: bobbins each including a trunk portion and a pair of guide portions that are disposed so as to protrude from two longitudinal ends of an upper surface of the trunk portion are disposed such that longitudinal directions of the trunk portions are oriented in a radial direction of the teeth, and so as to place bottom surfaces of the trunk portions alongside two axial end surfaces of the teeth; and the concentrated winding coils are configured by winding a conductor wire a predetermined number of times around the teeth so as to pass through a concave space that is formed by the trunk portions and the pairs of guide portions at two axial ends of the teeth.

According to the present invention, because the concentrated winding coils are configured by winding a conductor wire a predetermined number of times around the teeth so as to pass through a concave space that is formed by the trunk portions and the pairs of guide portions at two axial ends of the teeth, radial and axial movements of the concentrated winding coils are restricted. Thus, the concentrated winding coil is prevented from moving due to vibration, and dislodging from the teeth, or rubbing against the teeth, and giving rise to insulation failure.

DETAILED DESCRIPTION OF THE PREFERRED EMBODIMENTS

Preferred embodiments of a rotary electric machine according to the present invention will now be explained using the drawings.

Embodiment 1

Figure 1:
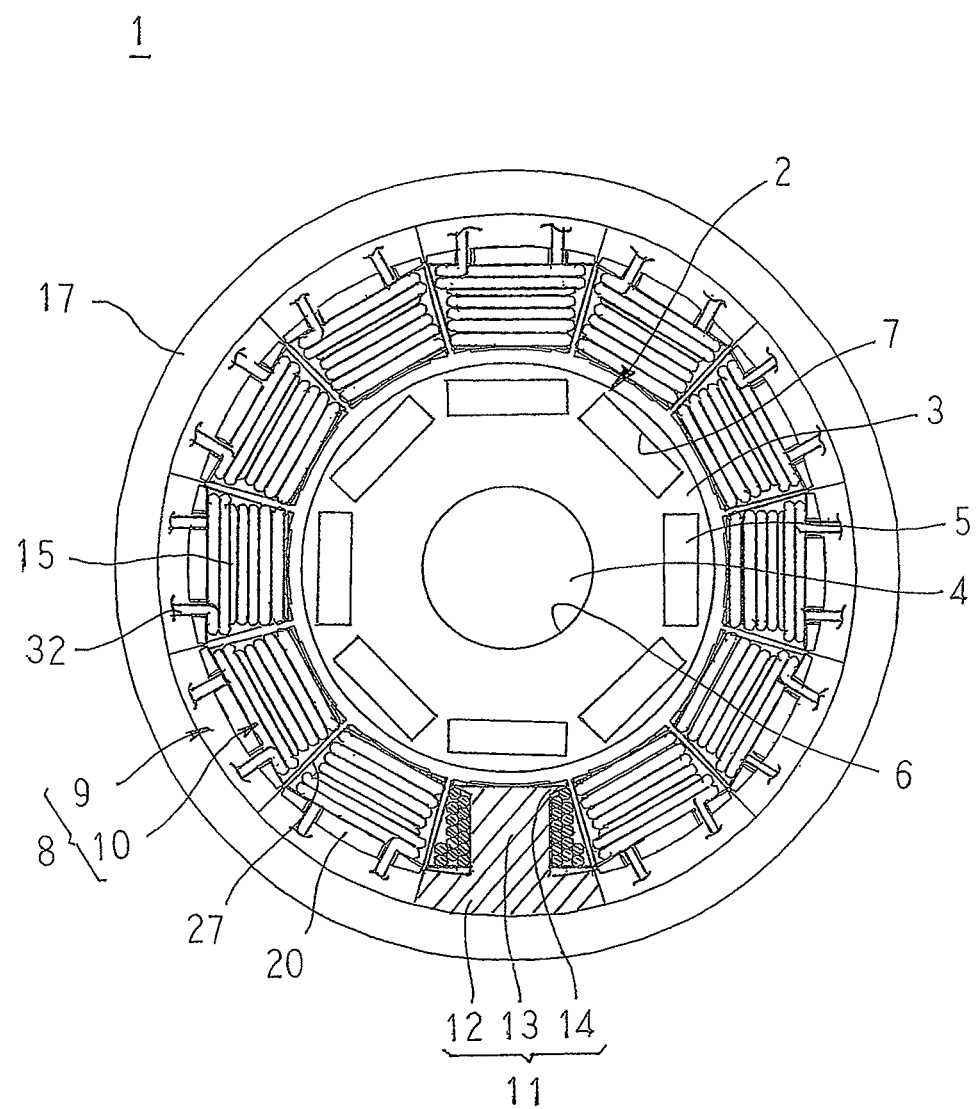
FIG. 1 is a partially cut away end elevation that shows an automotive electric motor according to Embodiment 1 of the present invention.
Figure 2:
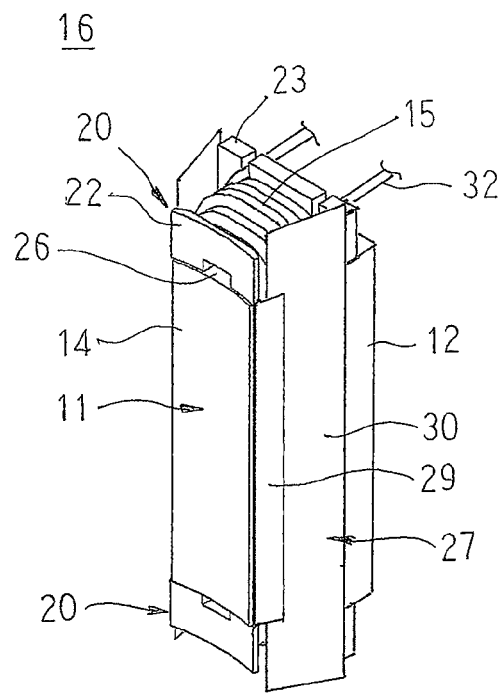
FIG. 2 is a perspective that shows a coil assembly in the automotive electric motor according to Embodiment 1 of the present invention.
Figure 3:
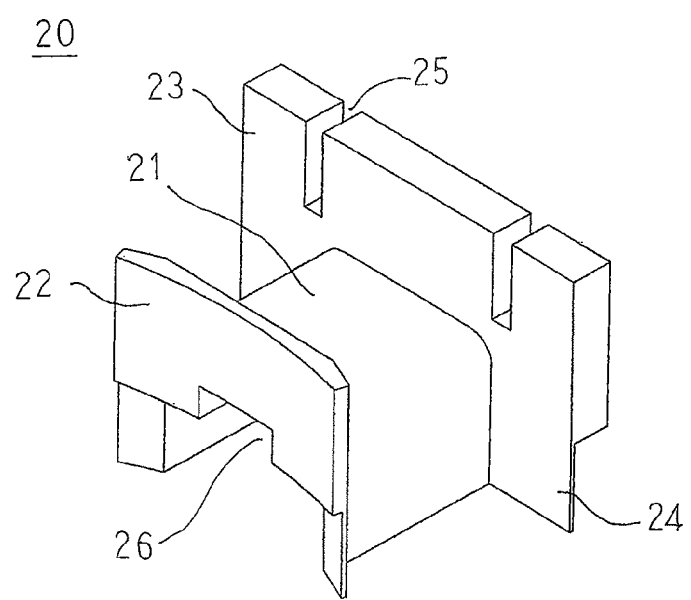
FIG. 3 is a perspective that shows a bobbin that is installed in the coil assembly in the automotive electric motor according to Embodiment 1 of the present invention.
Figure 4:
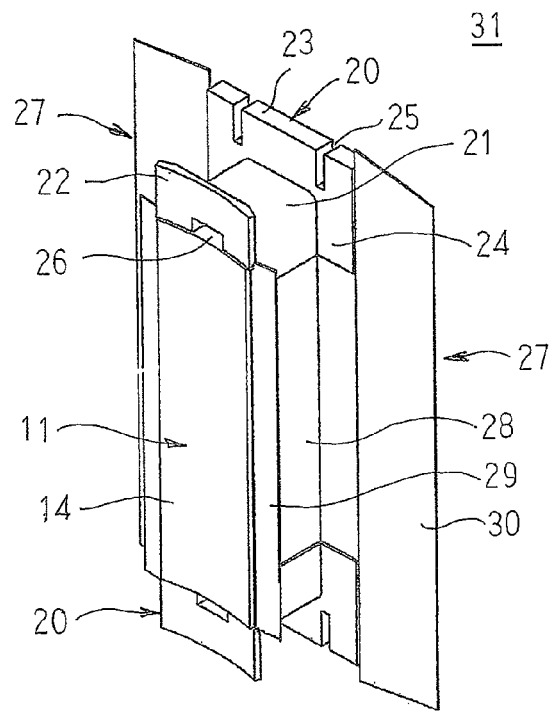
FIG. 4 is a perspective that shows a core assembly in the automotive electric motor according to Embodiment 1 of the present invention.
Figure 5:
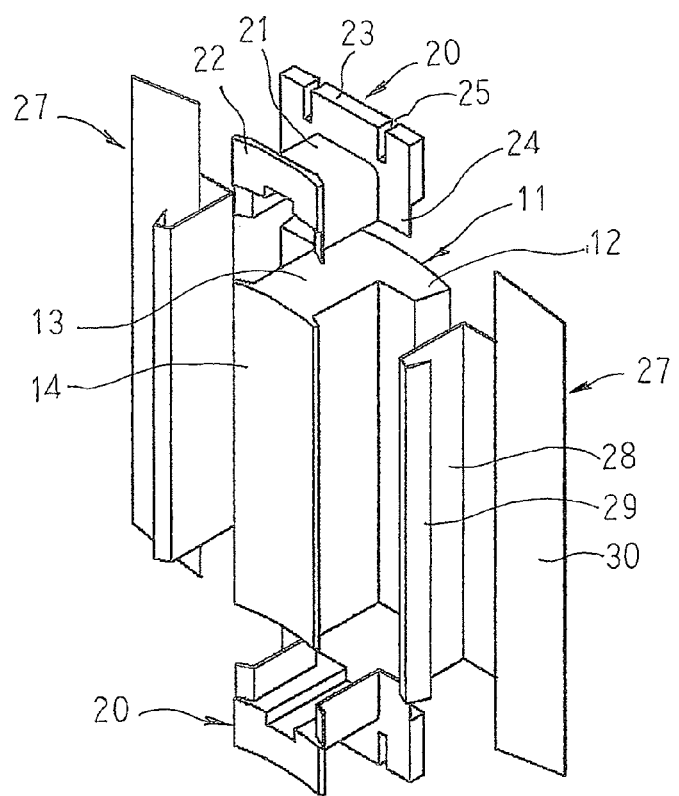
FIG. 5 is an exploded perspective that shows the core assembly in the automotive electric motor according to Embodiment 1 of the present invention.
Figure 6:
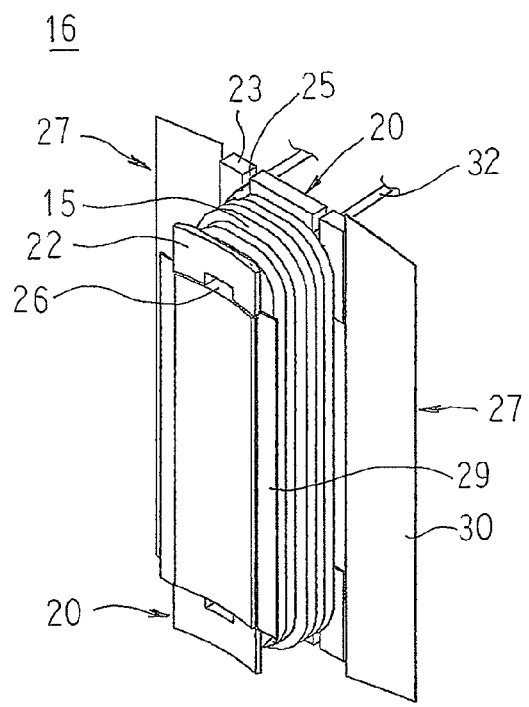
FIG. 6 is a perspective that shows the coil assembly in the automotive electric motor according to Embodiment 1 of the present invention in a state in which cover portions are not folded over.
Figure 7:
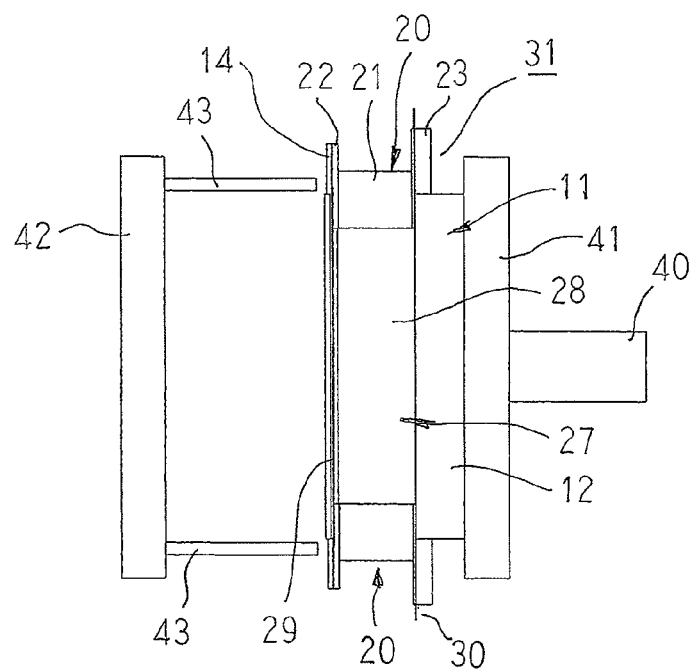
FIG. 7 is a side elevation that explains a method for winding a coil onto the core assembly in the automotive electric motor according to Embodiment 1 of the present invention.
Figure 8:
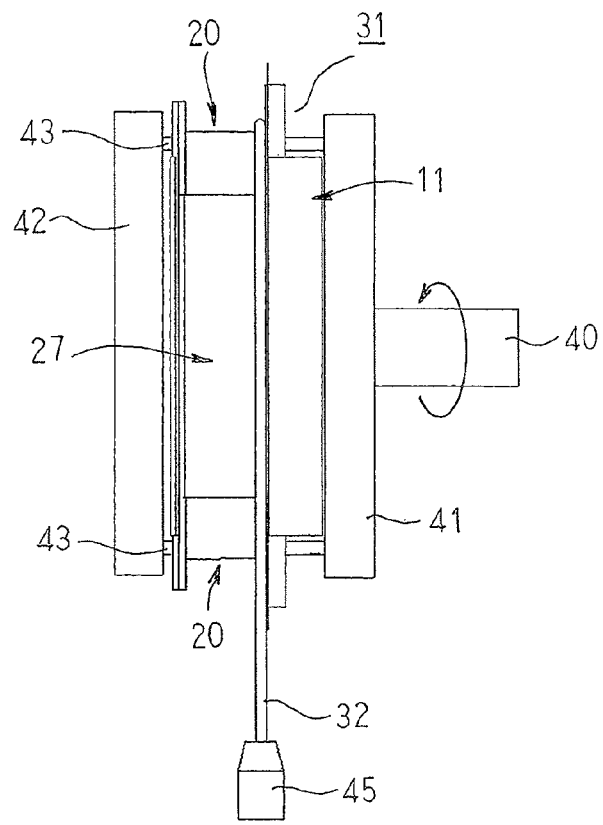
FIG. 8 is a side elevation that explains the method for winding the coil onto the core assembly in the automotive electric motor according to Embodiment 1 of the present invention.
Figure 9:
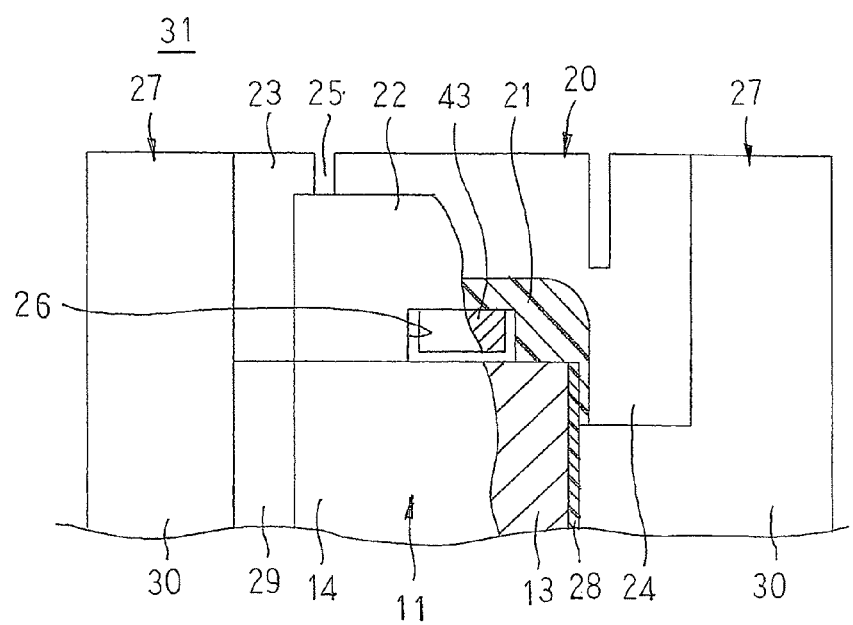
FIG. 9 is a partially cutaway front elevation that shows a mounted state of a tension supporting arm on the core assembly in the automotive electric motor according to Embodiment 1 of the present invention.

FIG. 1 is a partially cut away end elevation that shows an automotive electric motor according to Embodiment 1 of the present invention, FIG. 2 is a perspective that shows a coil assembly in the automotive electric motor according to Embodiment 1 of the present invention, FIG. 3 is a perspective that shows a bobbin that is installed in the coil assembly in the automotive electric motor according to Embodiment 1 of the present invention, FIG. 4 is a perspective that shows a core assembly in the automotive electric motor according to Embodiment 1 of the present invention, FIG. 5 is an exploded perspective that shows the core assembly in the automotive electric motor according to Embodiment 1 of the present invention, FIG. 6 is a perspective that shows the coil assembly in the automotive electric motor according to Embodiment 1 of the present invention in a state in which cover portions are not folded over, FIG. 7 is a side elevation that explains a method for winding a coil onto the core assembly in the automotive electric motor according to Embodiment 1 of the present invention, FIG. 8 is a side elevation that explains the method for winding the coil onto the core assembly in the automotive electric motor according to Embodiment 1 of the present invention, and FIG. 9 is a partially cutaway front elevation that shows a mounted state of a tension supporting arm on the core assembly in the automotive electric motor according to Embodiment 1 of the present invention.

In FIGS. 1 and 2, an automotive electric motor 1 that functions as a rotary electric machine includes: a shaft 4 that is rotatably supported by a frame (not shown); a rotor 2 that is fixed to the shaft 4 and that is rotatably disposed inside the frame; and a stator 8 that has: an annular stator core 9; and a stator coil 10 that is mounted onto the stator core 9, the stator core 9 being held by the frame, and the stator 8 being disposed so as to surround the rotor 2 so as to have a predetermined gap interposed.

The rotor 2 includes: a rotor core 3 that is formed by laminating and integrating electromagnetic steel plates that have been punched into predetermined shapes, for example; a shaft 4 that is press-fitted into and fixed to a shaft insertion aperture 6 that is formed so as to pass through a central axial position of the rotor core 3; and permanent magnets 5 that are inserted into each of eight magnet insertion apertures 7 that are each formed so as to pass through the rotor core 3, and that are arranged concyclically at a uniform angular pitch.

The stator core 9 is constituted by twelve core segments 11. Specifically, the core segments 11 are formed so as to have shapes that are obtained by dividing the stator core 9 into twelve equal sections circumferentially. The core segments 11 are formed by laminating and integrating a large number of electromagnetic steel plates that have been punched into identical shapes, for example, and have: a circular arc-shaped core back portion 12; a tooth 13 that is disposed so as to extend radially inward from a circumferential center of an inner circumferential surface of the core back portion 12; and flange portions 14 that are disposed so as to extend from two circumferential sides of a projecting end of the tooth 13.

Coil assemblies 16 include: a core assembly 31 that is configured by disposing a pair of bobbins 20 on end surfaces of the core segment 11 from two axial ends of the core segment 11, and disposing a pair of insulating papers 27 on side surfaces of the core segment 11 from two circumferential sides of the core segment 11; and a concentrated winding coil 15 that is formed by winding a conductor wire 32 a predetermined number of times around the tooth 13 of the core segment 11 and the pair of bobbins 20.

The coil assemblies 16, which are arranged in an annular shape circumferentially by abutting circumferential end surfaces of the core back portions 12 of the core segments 11 to each other, are press-fitted into and fixed to an annular ring portion 17, or are inserted inside and fixed to the ring portion 17 by shrinkage fitting, to configure the stator 8. Moreover, the core segments 11 are arranged into an annular shape by abutting circumferential end surfaces of the core back portions 12 to each other to configure the stator core 9. The core back portions 12 link circumferentially to configure the core back of the stator core 9, and spaces that are formed by the core back and adjacent teeth 13 constitute slots. The stator coil 10 is constituted by the twelve concentrated winding coils 15 that are wound onto the teeth 13 of the core segments 11.

An automotive electric motor 1 that is configured in this manner operates as an 8-pole 12-slot synchronous electric motor.

Next, detailed configuration of a core assembly 31 will be explained with reference to FIGS. 3 through 5.

The bobbins 20 are resin-molded bodies in which a polyphenylene sulfide (PPS) resin is used, for example. As shown in FIG. 3, the bobbins 20 have: a trunk portion 21 in which a cross section that is perpendicular to a longitudinal direction is an approximately rectangular shape in which rounding is applied to two corner portions on an upper portion side, and that is disposed such that the longitudinal direction is oriented in a radial direction of a tooth 13 and a bottom surface is parallel to two axial end surfaces of the tooth 13; a first guide portion 22 that extends away from the bottom surface (away from the teeth 13) from a first longitudinal end of an upper surface of the trunk portion 21; a second guide portion 23 that extends away from the bottom surface from a second longitudinal end of the upper surface of the trunk portion 21 so as to face the first guide portion 22; and thin skirt portions 24 that extend away from the upper surface of the trunk portion 21 from two end portions in a width direction of the trunk portion 21, the first guide portion 22, and the second guide portion 23 for a predetermined length. A pair of (first and second) slits 25 through which the conductor wire 32 is inserted are formed on the second guide portion 23. In addition, a tension supporting arm insertion groove 26 that functions as a tension supporting arm insertion portion is formed so as to extend from a first longitudinal end to a second end centrally in the width direction of the bottom surface of the trunk portion 21 so as to have a groove shape that has a rectangular cross section.

The insulating papers 27 are formed by press-molding a sheet that is formed by sandwiching a polyimide film between meta-aramid fibers, for example. As shown in FIG. 5, the insulating papers 27 have: protective portions 28 that are placed on wall surfaces of the core back portion 12, the tooth 13, and the flange portion 14 of the core segment 11 that define the slots; and first and second cover portions 29 and 30 that are folded over to cover the concentrated winding coil 15.

Thus, as shown in FIG. 5, the insulating papers 27 are disposed such that the protective portions 28 are placed on the wall surfaces of the core back portion 12, the tooth 13, and the flange portion 14 that define the slots from two circumferential sides of the core segment 11, and the bobbins 20 are disposed so as to orient the longitudinal direction of the trunk portions 21 in a radial direction of the tooth 13 so as to place the bottom surfaces of the trunk portions 21 alongside the end surfaces of the core segment 11 from two axial ends of the core segment 11. The core assembly 31 that is shown in FIG. 4 is assembled thereby.

Here, the bobbins 20 are disposed so as to cover entire axial end surfaces of the tooth 13 such that the skirt portions 24 extend so as to face wall surfaces of the core back portion 12, the tooth 13 and the flange portion 14 that define the slots so as to have a predetermined clearance. The insulating papers 27 are disposed on two circumferential sides of the core segment 11 such that two ends of the protective portions 28 are inserted between the skirt portions 24 and the wall surfaces of the core back portion 12, the tooth 13, and the flange portions 14 that define the slots.

The conductor wire 32 is led in through the first slit 25 and between the first guide portion 22 and the second guide portion 23, is wound a predetermined number of times around the tooth 13 of the core segment 11 and the pair of trunk portions 21 that are disposed on the axial ends thereof, and is then led out through the second slit 25. As shown in FIG. 6, the coil assembly 16 in which the concentrated winding coil 15 is wound onto the core assembly 31 is formed thereby. The first and second cover portions 29 and 30 of the insulating paper 27 are folded over such that this coil assembly 16 assumes the state that is shown in FIG. 2.

According to Embodiment 1, the concentrated winding coil 15 is mounted so as to pass through concave spaces that are formed by the trunk portions 21, the first guide portions 22, and the second guide portions 23 of the bobbins 20 that are disposed at two axial ends of the tooth 13. Thus, radial movement of the concentrated winding coil 15 is restricted by the first guide portion 22 and the second guide portion 23, which are disposed so as to be separated radially. Axial movement of the concentrated winding coil 15 is also restricted by the pair of trunk portions 21, which are disposed so as to be separated axially. Situations in which the concentrated winding coil 15 moves due to vehicle vibration, and is dislodged from the tooth 13, or rubs against the core segment 11 and gives rise to insulation failure, are thereby prevented.

Because the trunk portions 21 and the protective portions 28 are interposed between the concentrated winding coil 15 and the core segment 11, electrical insulation is ensured between the concentrated winding coil 15 and the core segment 11. Because the first and second cover portions 29 and 30 cover the circumferential side surfaces of the concentrated winding coil 15, electrical insulation is also ensured between circumferentially adjacent concentrated winding coils 15.

Next, a method for winding the conductor wire 32 will be explained with reference to FIGS. 7 through 9.

First, as shown in FIG. 7, the core assembly 31 is mounted to a main shaft 40 of a winding machine (not shown) by fixing the core segment 11 to a supporting plate 41 that is configured integrally on the main shaft 40 such that an outer circumferential surface of the core back portion 12 is oriented toward the supporting plate 41.

A pair of tension supporting arms 43 are formed so as to have rectangular cross-sections, and first ends thereof are fixed to a tension supporting member 42 that is configured so as to enable length adjustment. Second end portions of the pair of tension supporting arms 43 are inserted into each of the tension supporting arm insertion grooves 26, and, as shown in FIG. 9, length of the tension supporting member 42 is adjusted such that the tension supporting arms 43 come into surface contact with wall surfaces of the tension supporting arm insertion grooves 26 that face the tooth 13, i.e., bottom surfaces, and separate from the tooth 13. Next, second ends of the tension supporting arms 43 that project outward from the tension supporting arm insertion grooves 26 are fixed to the supporting plate 41. Minute gaps are formed between the bottom surfaces of the trunk portions 21 of the bobbins 20 and the axial end surfaces of the tooth 13.

Next, a leading end portion of the conductor wire 32 that is led out through a nozzle 45 is wound onto a temporary fastening portion (not shown) of the supporting plate 41 and the conductor wire is led in through the first slit 25 and between the first guide portion 22 and the second guide portion 23. Then, as shown in FIG. 8, the conductor wire 32 that is paid out through the nozzle 45 while the main shaft 40 is rotated, passes through the concave spaces that are formed by the trunk portions 21 that are disposed on the two axial ends of the tooth 13 and the first and second guide portions 22 and 23, and is wound around the tooth 13 a predetermined number of times. The conductor wire 32 is then led out through the second slit 25, and the conductor wire 32 that is led out through the slit 25 is cut. Next, fixing between the tension supporting arms 43 and the supporting plate 41 is released, the length of the tension supporting member 42 is shortened, and the tension supporting arms 43 are pulled out of the tension supporting arm insertion grooves 26. In addition, fixing between the supporting plate 41 and the core segment 11 is released, and the core assembly 31 is removed from the main shaft 40 to obtain the coil assembly 16 that is shown in FIG. 6.

First and second cover portions 29 and 30 of coil assemblies 16 that are formed in this manner are folded over, the coil assemblies 16 are arranged annularly by abutting circumferential end surfaces of the core back portions 12 of the core segments 11 with each other, and are inserted into and held by a ring portion 17 by press-fitting or shrinkage-fitting to obtain the stator 8.

Now, when the conductor wire 32 is wound onto the tooth 13 of the core segment 11, winding tightening forces arise in the conductor wire 32. In the core segment 11, because a large number of electromagnetic steel plates are laminated and integrated by crimping, etc., when the winding tightening forces act on the core segment 11, gaps between the laminated electromagnetic steel plates become narrower. Because the conductor wire 32 is wound onto the tooth 13, the gaps between the laminated electromagnetic steel plates in the tooth 13 become narrower to a greater extent than narrowing of gaps between the laminated electromagnetic steel plates in the core back portion 12, giving rise to the buckling in the core segment 11. Because this buckling gives rise to increases in outside diameter dimensions of the annular body that is formed by arranging the core segments into an annular shape, mounting of the annular body that is formed by arranging the core segments 11 into an annular shape into the ring portion 17 in the step of press fitting or shrinkage fitting is difficult.

In this method for winding the conductor wire 32, because the tension supporting arms 43 are inserted into the tension supporting arm insertion grooves 26 so as to contact the bobbin 20 and are fixed to the supporting plate 41, the winding tightening forces from the conductor wire 32 are borne by the tension supporting arms 43, and do not act on the core segment 11. Thus, because occurrences of buckling of the core segment 11 that result from winding tightening forces from the conductor wire 32 can be suppressed, mounting of the coil assemblies 16 into the ring portion 17 in the step of the press fitting and shrinkage fitting is facilitated, increasing yield.

Moreover, the tension supporting member 42 and the tension supporting arms 43 should be rigid enough to support the winding tightening forces without displacing, and a stainless alloy, for example, can be used.

The groove shapes of the tension supporting arm insertion grooves 26 are not limited to being rectangular, and may also be semicircular or elliptical. In that case, the tension supporting arms 43 should have a cross-sectional shape that comes into surface contact with the wall surfaces of the tension supporting arm insertion grooves 26 that face the tooth 13.

Minute gaps are formed between the bottom surfaces of the trunk portions 21 and the end surfaces of the tooth 13, but the bottom surfaces of the trunk portions 21 may also contact the end surfaces of the tooth 13 provided that the tension supporting arms 43 have enough rigidity not to be displaced by the winding tightening forces.

Embodiment 2

Figure 10:
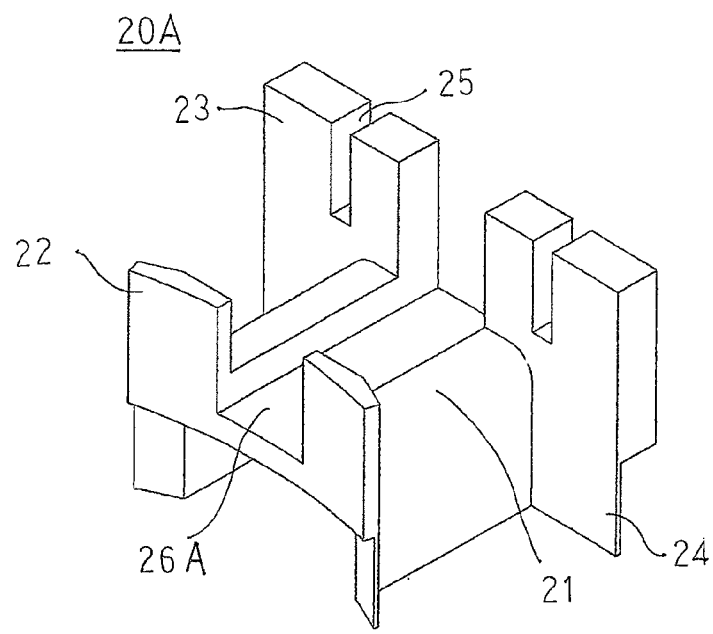
FIG. 10 is a perspective that shows a bobbin that is installed in a coil assembly in an automotive electric motor according to Embodiment 2 of the present invention.
Figure 11:
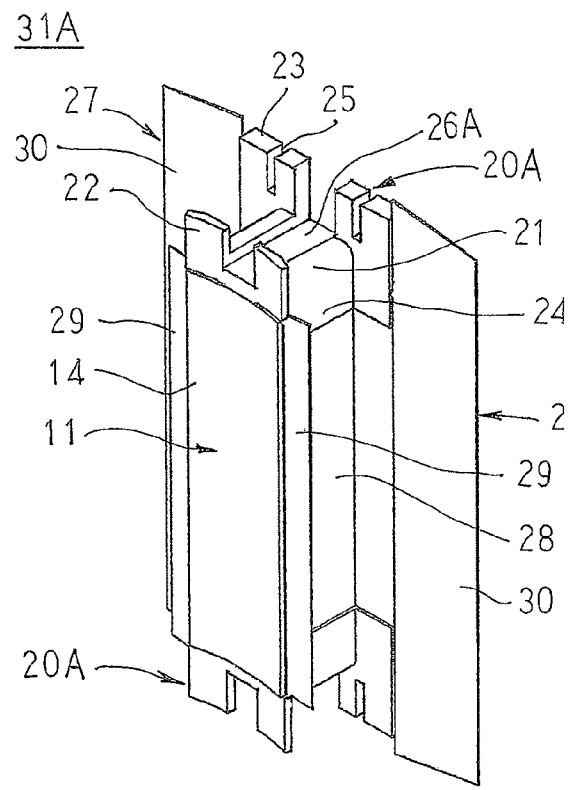
FIG. 11 is a perspective that shows a core assembly in the automotive electric motor according to Embodiment 2 of the present invention.
Figure 12:
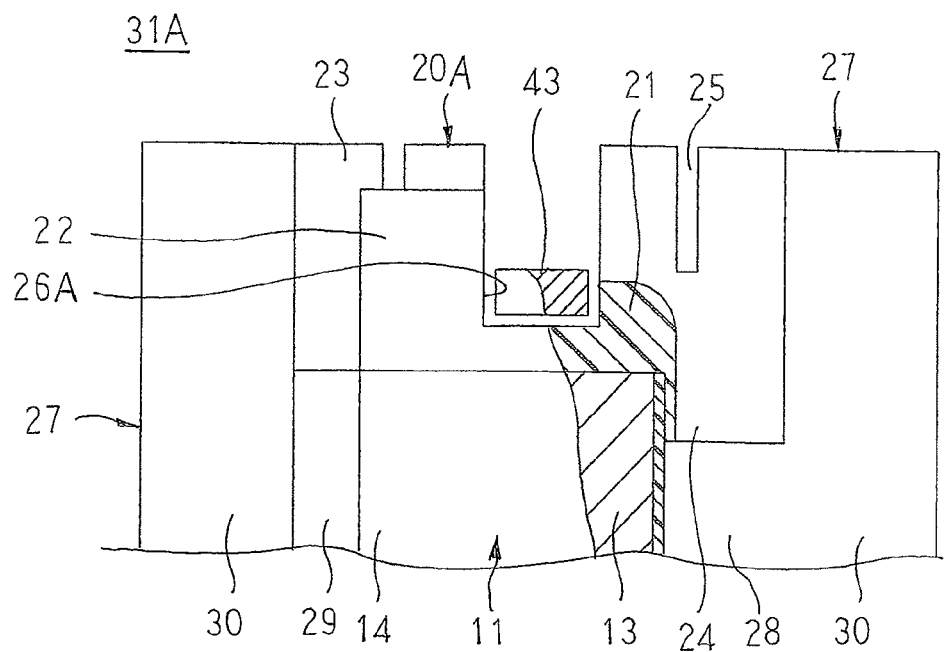
FIG. 12 is a partially cutaway front elevation that shows a mounted state of a tension supporting arm on the core assembly in the automotive electric motor according to Embodiment 2 of the present invention.

FIG. 10 is a perspective that shows a bobbin that is installed in a coil assembly in an automotive electric motor according to Embodiment 2 of the present invention, FIG. 11 is a perspective that shows a core assembly in the automotive electric motor according to Embodiment 2 of the present invention, and FIG. 12 is a partially cutaway front elevation that shows a mounted state of a tension supporting arm on the core assembly in the automotive electric motor according to Embodiment 2 of the present invention.

In FIGS. 10 and 11, a tension supporting arm insertion groove 26A that functions as a tension supporting arm insertion portion is formed so as to extend from a first longitudinal end to a second end centrally in a width direction of an upper surface of a trunk portion 21 of a bobbin 20A so as to have a groove shape that has a rectangular cross section. A core assembly 31A is assembled using the bobbin 20A instead of the bobbin 20.

Moreover, the rest of the configuration is configured in a similar manner to Embodiment 1 above.

In Embodiment 2, the length of the tension supporting member 42 is adjusted, and, as shown in FIG. 12, the tension supporting arms 43 are inserted into each of the tension supporting arm insertion grooves 26A so as to protrude outward slightly from the upper surface of the trunk portions 21.

Then, projecting ends of the tension supporting arms 43 are fixed to the supporting plate 41, in a similar manner to Embodiment 1 above, and the conductor wire 32 that is paid out through the nozzle 45 is wound a predetermined number of times around the tooth 13 and the pair of trunk portions 21 that are disposed on the two axial ends thereof while rotating the main shaft 40. Next, fixing between the tension supporting arms 43 and the supporting plate 41 is released, the length of the tension supporting member 42 is shortened, and the tension supporting arms 43 are pulled out of the tension supporting arm insertion grooves 26. In addition, fixing between the supporting plate 41 and the core segment 11 is released and the core assembly 31A is removed from the main shaft 40.

In Embodiment 2, because the winding tightening forces from the conductor wire 32 are also borne directly by the tension supporting arms 43 that protrude outward from the upper surfaces of the trunk portions 21, and do not act on the core segment 11, similar effects to those in Embodiment 1 above are exhibited.

Because the concentrated winding coils are mounted into concave spaces that are formed by the trunk portions 21, the first guide portions 22, and the second guide portions 23 of the bobbins 20A that are disposed at two axial ends of the teeth 13, situations in which the concentrated winding coils move due to vehicle vibration, and are dislodged from the tooth 13, or rub against the core segment 11 and give rise to insulation failure are prevented.

Embodiment 3

Figure 13:
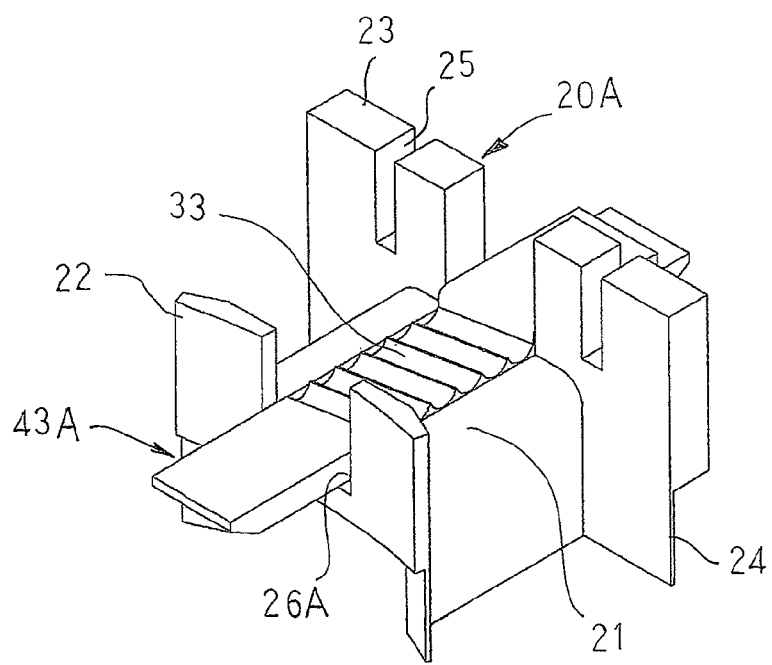
FIG. 13 is a perspective that shows a mounted state of a tension supporting arm on a bobbin in an automotive electric motor according to Embodiment 3 of the present invention.

FIG. 13 is a perspective that shows a mounted state of a tension supporting arm on a bobbin in an automotive electric motor according to Embodiment 3 of the present invention.

In FIG. 13, guiding grooves 33 are grooves that position a conductor wire 32 that is wound on, and a plurality thereof are formed at a predetermined pitch in a longitudinal direction on a surface of a tension supporting arm 43A that contacts the conductor wire 32 so as to have a groove direction that is inclined by a predetermined angle relative to a direction that is perpendicular to the longitudinal direction.

Moreover, the rest of the configuration is configured in a similar manner to Embodiment 2 above.

In Embodiment 3, although not shown, a conductor wire 32 that is led in through the first slit 25 and between the first guide portion 22 and the second guide portion 23 is guided by the guiding grooves 33 and wound around the tooth 13 and the pair of trunk portions 21 that are disposed on the axial ends thereof.

Thus, because the conductor wire 32 is wound onto the core assembly neatly, a concentrated winding coil that does not have winding disturbances can be obtained.

Now, a concentrated winding coil that does not have winding disturbances can also be obtained if guiding grooves 33 are formed on the upper surface of the trunk portions 21 in Embodiment 1 above. However, if the wire diameter of the conductor wire 32 is changed in a design modification, it is necessary to make bobbins in which the pitch of the guiding grooves is a pitch that conforms to the wire diameter of the conductor wire 32 after modification. In Embodiment 3, by preparing a plurality of types of tension supporting arms 43A that have guiding grooves 33 at different pitches in advance, even if the wire diameter of the conductor wire 32 is changed in a design modification, adaptation is possible by changing the tension supporting arms 43A.

Embodiment 4

Figure 14:
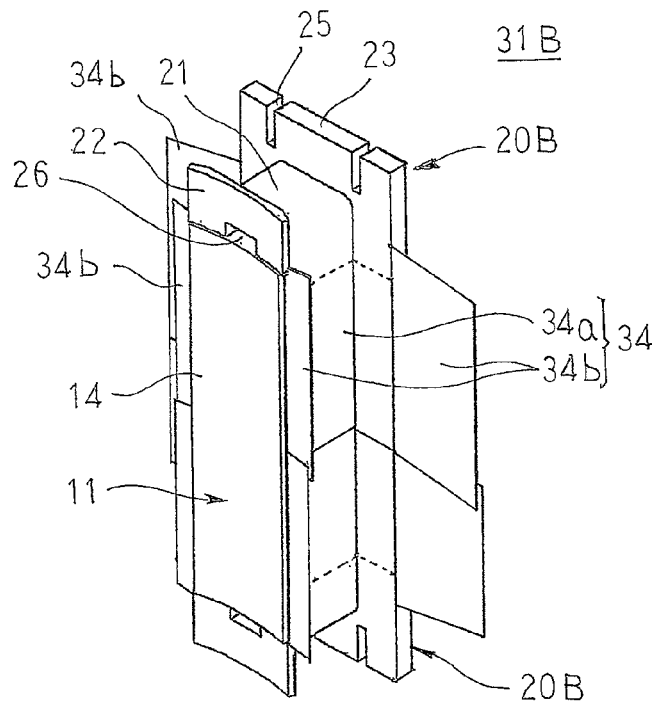
FIG. 14 is a perspective that shows a core assembly in the automotive electric motor according to Embodiment 4 of the present invention.

FIG. 14 is a perspective that shows a core assembly in the automotive electric motor according to Embodiment 4 of the present invention.

In FIG. 14, a bobbin 20B has thin skirt portions 34 that are constituted by: extended portions 34a that extend away from an upper surface of a trunk portion 21 from two end portions in a width direction of the trunk portion 21, a first guide portion 22, and a second guide portion 23; and overhanging portions 34b that hang over from the extended portions 34a in the longitudinal direction of the trunk portion 21. A core assembly 30B is configured by disposing a pair of the bobbins 20B on end surfaces of a core segment 11 from two axial ends of the core segment 11. The skirt portions 34 of the pair of bobbins 20B overlap.

Moreover, the rest of the configuration is configured in a similar manner to Embodiment 1 above.

In Embodiment 4, the wall surfaces of the core segment 11 that constitute the slots are covered by the extended portions 34a of the skirt portions 34 of the bobbins 20B to ensure electrical insulation between the concentrated winding coil and the core segment 11. The overhanging portions 34b of the skirt portions 34 are folded over to cover the circumferential side surfaces of the concentrated winding coil to ensure electrical insulation from adjacent concentrated winding coils. The extended portions 34a and the overhanging portions 34b of the skirt portions 34 thereby function as the protective portions of the insulating papers and the first and second cover portions.

Thus, according to Embodiment 4, because the insulating papers can be omitted, the number of parts is reduced, increasing ease of assembly of the core assembly 30B.

Embodiment 5

Figure 15:
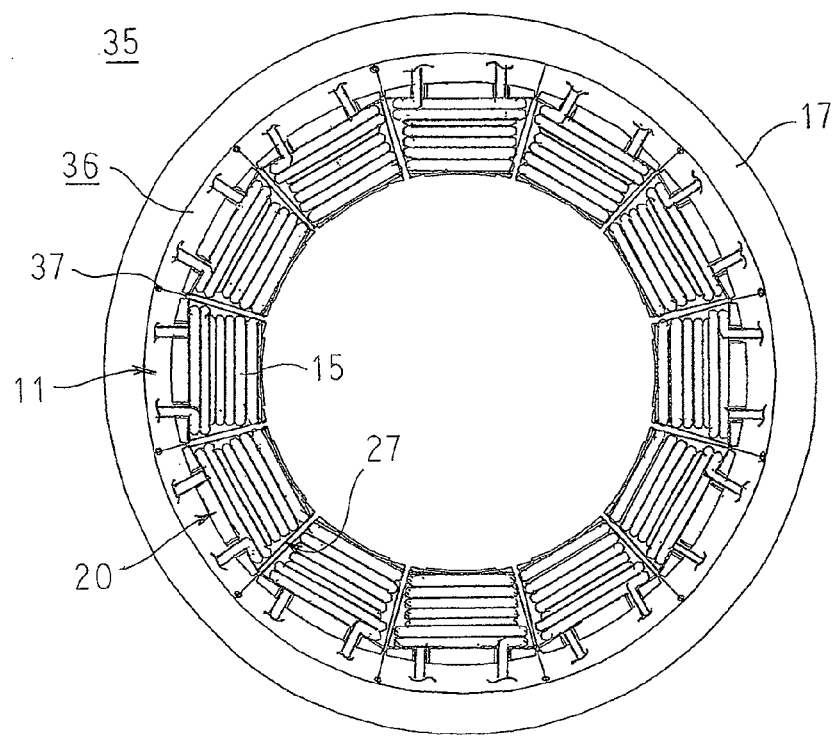
FIG. 15 is an end elevation that shows a stator in an automotive electric motor according to Embodiment 5 of the present invention.

FIG. 15 is an end elevation that shows a stator in an automotive electric motor according to Embodiment 5 of the present invention, and FIG. 16A through 16D are process diagrams that explain a method for manufacturing the stator in the automotive electric motor according to Embodiment 5 of the present invention.

In FIG. 15, a core segment group 36 is configured by linking together outer circumferential portions of circumferential end surfaces of core back portions 12 of twelve core segments 11 using bendable linking portions 37. A stator 35 is configured by rolling up the core segment group 36 into an annular shape by bending each of the linking portions 37 and being inserted into and held by a ring portion 17 by press fitting or shrinkage fitting.

Next, a manufacturing method for the stator 35 will be explained with reference to FIG. 16. Moreover, the core segment group 36 appears to be made of five core segments 11 in FIG. 16, but the core segment group 36 is actually made of twelve core segments 11.

Figure 16A:
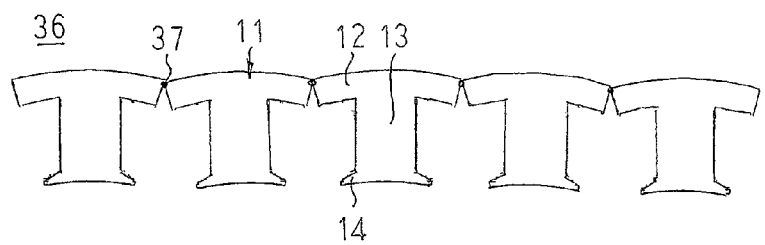
FIG. 16A through 16D are process diagrams that explain a method for manufacturing the stator in the automotive electric motor according to Embodiment 5 of the present invention.

First, thin portions that link outer circumferential portions at two circumferential ends of the core back portions 12 of the core segments 11 are formed simultaneously when electromagnetic steel plates are shaped by punching. Thus, as shown in FIG. 16A, a large number of the punched electromagnetic steel plates are laminated and integrated to form the core segment group 36 in which the twelve core segments 11 are linked by the thin portions of the laminated portion, i.e., the bendable linking portions 37.

Figure 16B:
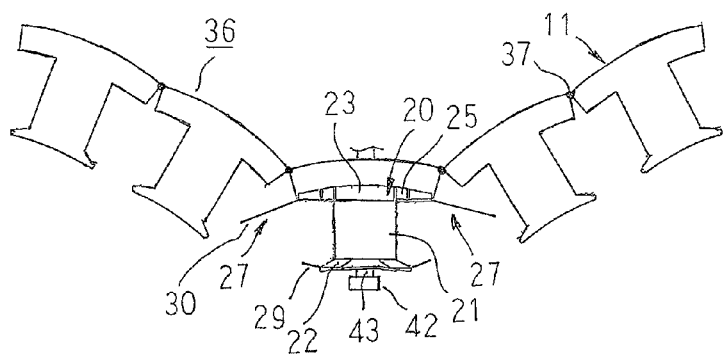

Next, the core segment group 36 is mounted to a supporting plate (not shown). Then, as shown in FIG. 16B, winding space for the core segment 11 that is being subjected to coil winding is ensured by bending the linking portions 37 on both sides of the core segment 11 in question, the pair of bobbins 20 are disposed on the end surfaces of the core segment 11 from two axial ends, and the insulating papers 27 are disposed on two circumferential sides of the core segment 11.

Figure 16C:
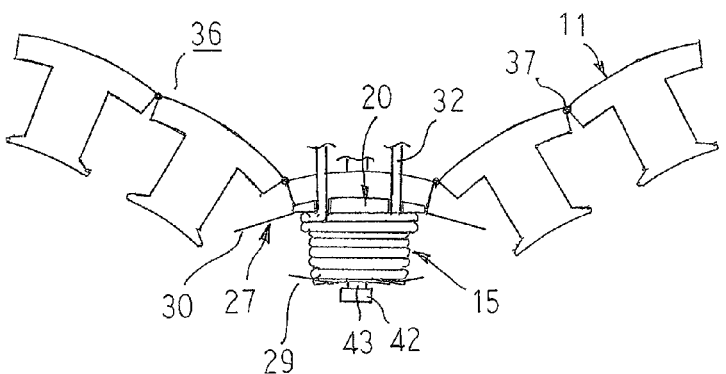

Next, the tension supporting arms 43 are inserted into the tension supporting arm insertion grooves of the bobbin 20, and the projecting ends thereof are fixed to the supporting plate. Then, as shown in FIG. 16C, the concentrated winding coil 15 is mounted by winding the conductor wire 32 on by making the nozzle (not shown) that pays out the conductor wire 32 orbit a predetermined number of times around the tooth 13 and the pair of bobbins 20 that are disposed on the two ends of the tooth 13. The circumferential side surfaces of the concentrated winding coil 15 are then covered by folding over the first and second cover portions 29 and 30 of the insulating papers 27, and the tension supporting arms 43 are pulled out of the tension supporting arm insertion grooves.

Figure 16D:
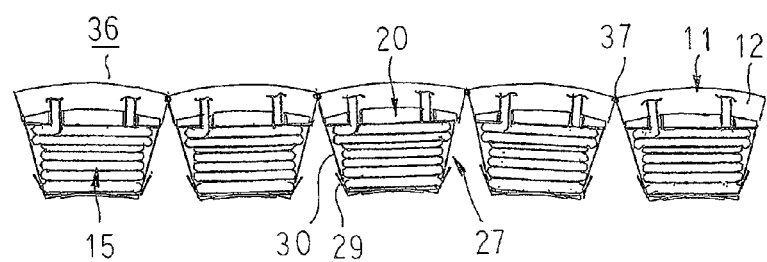

As shown in FIG. 16D, the concentrated winding coils 15 are mounted to all of the core segments 11 by implementing this step of mounting the concentrated winding coil 15 sequentially on each of the core segments 11.

Next, the stator 35 that is shown in FIG. 15 is assembled by rolling up the core segment group 36 into an annular shape by bending each of the linking portions 37 and inserting and holding the core segment group 36 in the ring portion 17 by press fitting or shrinkage fitting. Circumferential end surfaces of the core segments 11 of the core segment group 36 are abutted and are arranged annularly to configure the stator core.

In Embodiment 5, because the winding tightening forces from the conductor wire 32 are also borne by the tension supporting arms 43, and do not act on the core segment 11, similar effects to those in Embodiment 1 above are exhibited.

Moreover, in Embodiment 5 above, the linking portions are constituted by thin portions, but the linking portions need only be configured so as to enable bending, and recess portions may also be formed on first facing end portion outer circumferential portions of adjacent core segments, salient portions formed on second facing end portions, and the recess portions and salient portions fitted together to link the core segments pivotably (bendably), for example.

In Embodiment 5 above, the core segment group is rolled up into an annular shape by bending at the linking portions and press-fitted or shrinkage-fitted into an annular ring portion, but the core segment group may also be rolled up into an annular shape by bending at the linking portions, and the end surfaces of the core back portions of the core segments at two ends abutted to each other, and joined by welding.

In each of the above embodiments, explanations are given for automotive electric motors, but the present invention is not limited to automotive electric motors, and can be applied to rotary electric machines such as automotive alternators, automotive generator-motors, etc., and is also not limited to automotive use.

In each of the above embodiments, a ratio between a magnetic pole count and a slot count in the automotive electric motors is 8:12, i.e., a pole-to-slot ratio is 2:3, but the pole-to-slot ratio is not limited to 2:3, and may also be 4:3, for example.

In each of the above embodiments, the tension supporting arm insertion portion is constituted by tension supporting arm insertion grooves that have an opening on a bottom surface or an upper surface of the trunk portion, but the tension supporting arm insertion portion may also be constituted by tension supporting arm insertion apertures that pass through the trunk portion in a longitudinal direction.

In each of the above embodiments, the stator core and the rotor core are formed by laminating and integrating electromagnetic steel plates, but the materials of the stator core and the rotor core are not limited to electromagnetic steel plates, and need only be magnetic steel plates.

What is claimed is:

1. A method for manufacturing a stator for a rotary electric machine, comprising:

an annular stator core that is formed by laminating and integrating magnetic steel plates; and concentrated winding coils that are mounted to respective teeth of said stator core, said method for manufacturing a rotary electric stator comprising:

a bobbin installing step in which bobbins each including a trunk portion and a pair of guide portions that are disposed so as to protrude from two longitudinal ends of an upper surface of said trunk portion are installed such that longitudinal directions of said trunk portions are oriented in a radial direction of said teeth, and so as to place bottom surfaces of said trunk portions alongside two axial end surfaces of said teeth; and a concentrated winding coil mounting step in which a conductor wire is wound a predetermined number of times around said teeth so as to pass through a concave space that is formed by said trunk portions and said pairs of guide portions at two axial ends of said teeth;

a tension supporting arm insertion portion is formed in advance so as to pass longitudinally through said trunk portion of said bobbin; and a tension supporting arm is inserted through said tension supporting arm insertion portion prior to said concentrated winding coil mounting step such that a winding tightening force of said conductor wire is borne by said tension supporting arm in said concentrated winding coil mounting step.

2. The method for manufacturing a stator for a rotary electric machine according to claim 1, wherein:

said tension supporting arm insertion portion is formed by a groove that is formed so as to extend from a first longitudinal end to a second end of said upper surface of said trunk portion;
said tension supporting arm is inserted through said tension supporting arm insertion portion so as to protrude outward from said upper surface of said trunk portion; and
guiding grooves that guide said conductor wire are arranged at a predetermined pitch in a longitudinal direction on said portion of said tension supporting arm that protrudes outward from said upper surface of said trunk portion.

* * * * *